(12) United States Patent
Morency et al.

(10) Patent No.: US 9,221,622 B2
(45) Date of Patent: Dec. 29, 2015

(54) PRODUCT ORIENTOR

(71) Applicant: AXIUM Inc., Montreal (CA)

(72) Inventors: Sylvain-Paul Morency, Montreal (CA); Regis Metivier, Montreal (CA); Marc Ducharme, Montreal (CA); Robert Jodoin, Montreal (CA); Jean-Francois Forget, Montreal (CA); Christian Simon, Montreal (CA)

(73) Assignee: AXIUM Inc., Montreal (CA)

( * ) Notice: Subject to any disclaimer, the term of this patent is extended or adjusted under 35 U.S.C. 154(b) by 0 days.

(21) Appl. No.: 14/599,084

(22) Filed: Jan. 16, 2015

(65) Prior Publication Data

US 2015/0210483 A1  Jul. 30, 2015

Related U.S. Application Data

(60) Provisional application No. 61/931,224, filed on Jan. 24, 2014.

(51) Int. Cl.
*B65G 47/244* (2006.01)
*B65G 41/00* (2006.01)

(52) U.S. Cl.
CPC ............ *B65G 47/244* (2013.01); *B65G 41/002* (2013.01); *B65G 2811/0626* (2013.01)

(58) Field of Classification Search
CPC .... B65G 47/244; B65G 41/002; B65G 47/80; B65G 2811/0626
USPC .......... 198/394, 395, 398–400, 401, 414, 416
See application file for complete search history.

(56) References Cited

U.S. PATENT DOCUMENTS

| | | | |
|---|---|---|---|
| 3,595,370 A * | 7/1971 | Fujishiro | B65H 31/3054 198/374 |
| 4,085,839 A | 4/1978 | Crawford | |
| 4,149,621 A | 4/1979 | Sollenberger | |
| 4,437,114 A | 3/1984 | LaRussa | |
| 4,669,602 A | 6/1987 | Ouelette | |
| 4,993,536 A | 2/1991 | Bell | |
| 5,240,102 A * | 8/1993 | Lucas | B65G 13/10 198/456 |
| 5,353,358 A | 10/1994 | Baird et al. | |
| 5,533,358 A | 7/1996 | Crandall et al. | |
| 5,706,929 A | 1/1998 | Easton | |
| 6,435,332 B1 | 8/2002 | Price | |
| 6,681,917 B2 * | 1/2004 | Van Den Goor | B65G 47/244 198/370.04 |
| 6,863,173 B2 | 3/2005 | Bennett | |
| 6,935,484 B2 | 8/2005 | Davis et al. | |

(Continued)

Primary Examiner — Mark A Deuble

(57) ABSTRACT

Embodiments of a product orientor include a turner conveyor that defines conveying plan and direction for a product received thereon and that has an initial orientation relative to the conveying direction. The initial orientation is determined by a vision system that is positioned upstream from the turner conveyor. The turner conveyor is rotatable about an axis that is perpendicular to the conveying plan between a conveying orientation, wherein the product is in the initial orientation, and a rectifying orientation, wherein the product is in a predetermined orientation relative to the conveying orientation. The product orientor further includes pressure plates that are movable between a retracted configuration and a holding configuration wherein the product is maintained in the predetermined orientation while the turner conveyor is moved from the rectifying orientation to the initial conveying orientation.

20 Claims, 5 Drawing Sheets

(56) References Cited

U.S. PATENT DOCUMENTS

| | | | |
|---|---|---|---|
| 6,944,324 B2 * | 9/2005 | Tran | G06T 7/0004 |
| | | | 382/101 |
| 7,097,029 B2 | 8/2006 | Halang | |
| 7,731,010 B2 | 6/2010 | Kissee et al. | |
| 7,931,137 B2 | 4/2011 | Wargo | |
| 8,002,104 B2 | 8/2011 | Lim et al. | |
| 8,181,767 B2 * | 5/2012 | Gales | A21C 9/08 |
| | | | 198/404 |
| 8,205,738 B1 | 6/2012 | Fourney | |
| 8,776,983 B2 * | 7/2014 | Yang | B65G 47/244 |
| | | | 198/412 |
| 2010/0256810 A1 * | 10/2010 | Weber | B65G 47/24 |
| | | | 700/230 |
| 2012/0298481 A1 | 11/2012 | Fourney | |

* cited by examiner

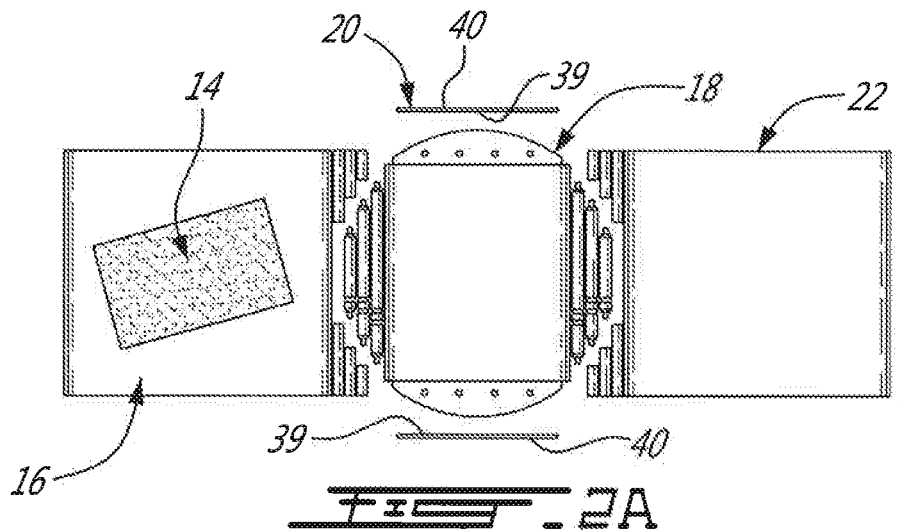
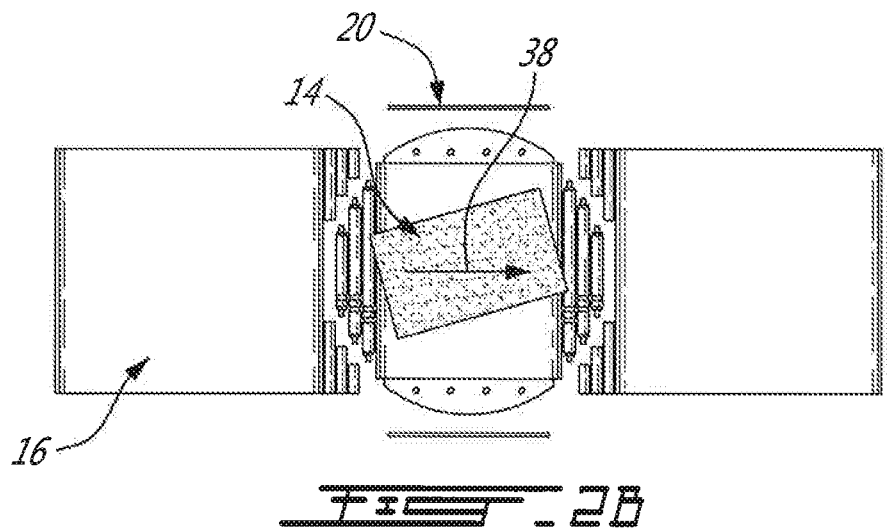
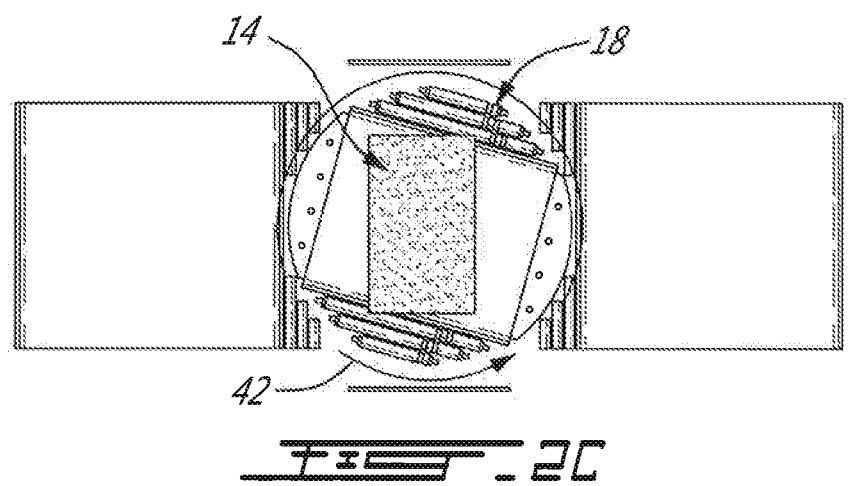

PRODUCT ORIENTOR

CROSS REFERENCE TO RELATED PATENT APPLICATION

This U.S. patent relates to and claims priority to corresponding U.S. Provisional Patent Application No. 61/931,224, which was filed on Jan. 24, 2014, and the entire disclosure is incorporated herein by reference.

BACKGROUND

Product orientors are well-known in the art of goods conveying. They aim at modifying the initial orientation of a product so that it is correctly positioned for a given product processing station.

A device for aligning parcel goods is described in U.S. Pat. No. 7,097,029 B2, issued to Halang on Aug. 29, 2006 and being titled "Parcel Orienting Device". This device includes rollers and, for each rollers, a manipulation unit that is adapted to vary the speed and/or direction of rotation of the roller. A drawback of this device is that it includes numerous motorized parts and as such is prone to malfunctions and breakage. Also, such a complex system requires intensive maintenance and parts replacement.

United States Patent Publication No. 2012/0298481 published on Nov. 29, 2012, naming Fourney as the inventor and titled "Multiwheel Roller-Conveyor Case Turner" describes a case turner that shares drawbacks with Halang's system.

BRIEF DESCRIPTION OF THE DRAWINGS

In the appended drawings:

FIGS. 2A-2G are top plan views of the orientor from FIG. 1, illustrating the operation thereof;

SUMMARY

Figure 1:
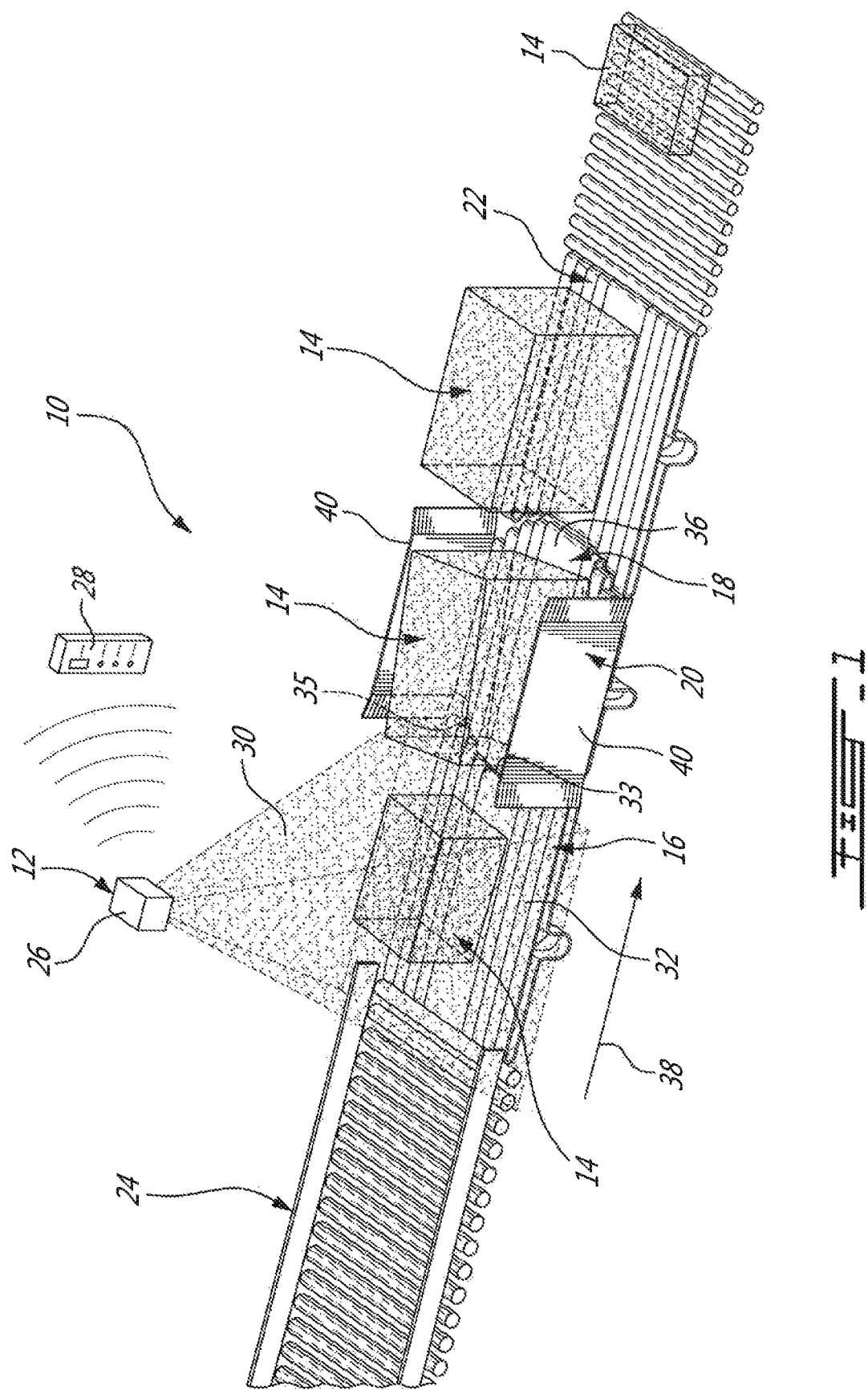
FIG. 1 is a perspective partly schematic view of a product orientor according to an illustrative embodiment; the product orientor being illustrated along a processing station.

In accordance with an illustrative embodiment, there is provided a product orientor comprising:

a turner conveyor that defines a conveying plan and that is rotatable about a rotation axis that is perpendicular to the conveying plan; the conveyor being rotatable about the rotation axis between a conveying orientation, wherein a product received thereon is in an initial orientation relative to the conveying orientation, and a rectifying orientation, wherein the product is in a predetermined orientation relative to the conveying orientation; and an immobilizing device that is movable between a retracted configuration relative to the product and a holding configuration, wherein the product is maintained in the predetermined orientation while the turner conveyor is moved from the rectifying orientation to the initial conveying orientation.

According to another illustrative embodiment, there is provided a product orientor comprising:

a vision system including 1) a vision system conveyor ia) for receiving a product thereon and ib) defining a conveying direction, and ii) at least one sensor having a view on the vision system conveyor for determining an initial orientation of the product relative to the conveying direction;

a turner conveyor adjacent the vision sensor conveyor, downstream thereof, that defines a conveying plan and that is rotatable about a rotation axis that is perpendicular to the conveying plan; the conveyor rotating about the rotation axis between a conveying orientation, wherein the product received thereon from the vision system conveyor is in the initial orientation relative, and a rectifying orientation, wherein the product is in a predetermined orientation relative to the conveying orientation;

an immobilizing device including two lateral plates movable between a retracted configuration relative to the product and a holding configuration wherein the product is maintained in the predetermined orientation while the turner conveyor is moved from the rectifying orientation to the initial conveying orientation.

According to still another illustrative embodiment, there is provided a method for orienting a product comprising:

receiving a least one product on a conveying surface that defines a conveying direction; the at least one product having an initial orientation relative to the conveying direction;

rotating in unison the conveying surface and the at least one product thereon from the initial orientation of the product to a predetermined rectified orientation relative to the conveying direction; and immobilizing the at least one product in the rectified orientation while the conveying surface is rotating back the conveying direction.

Other objects, advantages and features will become more apparent upon reading of the following non-restrictive description of illustrative embodiments thereof, given by way of example only with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A product orientor 10 will now be described with reference to FIG. 1.

The product orientor 10 comprises a vision system 12 that determines the initial orientation of a product 14 moving on a vision system conveyor 16 along a conveying direction 38, a turner conveyor 18, positioned downstream from the conveyor 16 for rotating the product 14 from the initial orientation to a rectified orientation, a product-immobilizing device 20 that maintains the product 14 in the rectified orientation while the turner conveyor 18 is re-aligned along the conveying direction 38, and an output conveyor 22 that receives the aligned product 14 from the turner conveyor 18.

The term "product" should be construed in the description and in the claims as including any type of consumer goods in any type of packaging, such as, without limitations, closed cartons, totes, open top cartons, trays with or without shrink wrapped film, bags and pouches, etc.

In the following, the term "product" is used interchangeably in reference to any one of the boxes 14, notwithstanding its size and/or location on the orientor 10. This numeral reference choice is in part to further illustrate that the orientor 10 can be used to process products of different sizes without any adaptation or modification to the orientor 10 during operation thereof.

The dimensions of the products 14 may vary greatly between each different type of product. Typical dimensions (width×length×height) are between 4"×6"×2" (10.2 cm×15.2 cm×5.1 cm) and 25"×25"×52" (63.5 cm×63.5 cm×132.1 cm).

Each of the components 12 and 16-20 will now be described in more detail.

The vision system conveyor 16 receives products 14 from an input conveyor 24 that, in turn, receives incoming products 14 from external equipments such as, without limitations, a forklift or another conveyor (both not shown).

According to the illustrated embodiment, the input conveyor 24 is in the form of a roller conveyor. It is however not limited to such an embodiment and can also be in the form, for example, of a mattop conveyor or in any other form allowing to transport a product 14 to the vision system conveyor 16.

The vision system conveyor 16 is positioned downstream from the input conveyor 24, adjacent thereto. According to the first illustrated embodiment, the vision system conveyor 16 is in the form of a mattop conveyor. However, the vision system conveyor 16 can take any other form allowing to move a product 14 from the input conveyor 24 to the turner conveyor 18. The conveyor 16 is conventionally motorized.

The vision system 12 includes a sensor 26 positioned above the vision system conveyor 16, and an image processing unit 28 coupled to the sensor 26.

The edge 33 of the mattop conveyor 16 that is adjacent to the tuner conveyor 18 is accurate so as to complementary receive the rounded edge 35 of the turner conveyor 18, the reason of which will be described herein below in more detail. The length of the straps of the conveyor 16 are adjusted accordingly.

The sensor 26 allows acquiring data to reconstruct an image and/or a three-dimensional (3D) and/or a two-dimensional (2D) model of the product 14 located on the vision system conveyor 16.

The vision sensor 26 is not limited to being positioned centered above the vision system conveyor 16 as shown in FIG. 1. The sensor 26 may be positioned differently relative to the conveyor 16 so that, for example, the conveying surface thereof 32 is included in its field of view 30.

The sensor 26 is in the form of a typical industrial camera or of an image acquisition apparatus such as a Microsoft Kinect™ device. According to another embodiment (not shown), an array of sensors is used in place of the sensor 26.

The image processing unit 28, can be in the form of a programmed computer, a controller or any other device or system that is configured for receiving and analyzing sensor data so as to detect and locate the product 14, validate product characteristics, and determine product dimensions and orientation as will be described herein below in more detail. This image and data analyzing device 28 can be incorporated in the sensor case 26 or be independent therefrom but wired thereto or wirelessly coupled thereto as shown in FIG. 1.

The vision system 12 determines the initial orientation of the product 14 on the vision system conveyor 16 relative to the conveying direction, and feed this information, or information indicative thereof, to the controller (not shown) of the turner conveyor 18. Using this information, the turner conveyor 18 can precisely rotate the product 14 to a 0 or 90 degrees orientation or to any other predetermined orientation relative to the conveying direction.

Figure 3A:
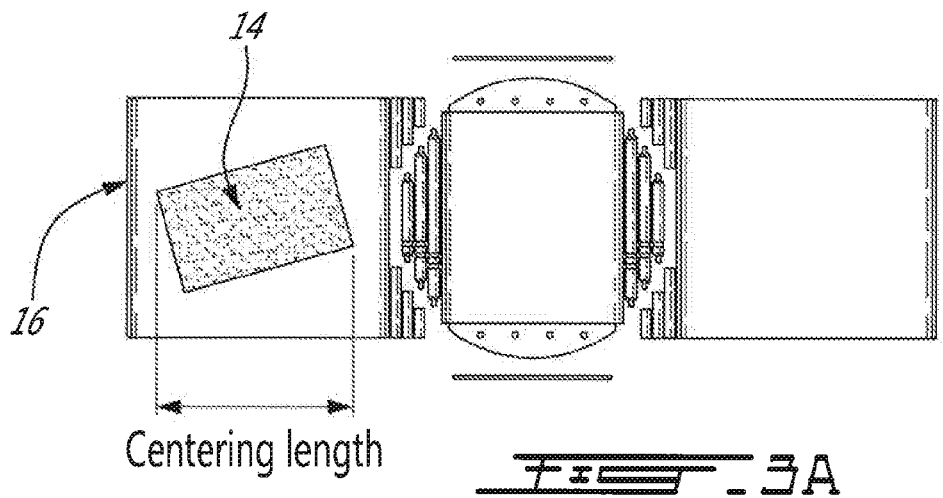
FIGS. 3A-3B are top plan views of the orientor from FIG. 1, illustrating centering dimensions of a product.
Figure 3B:
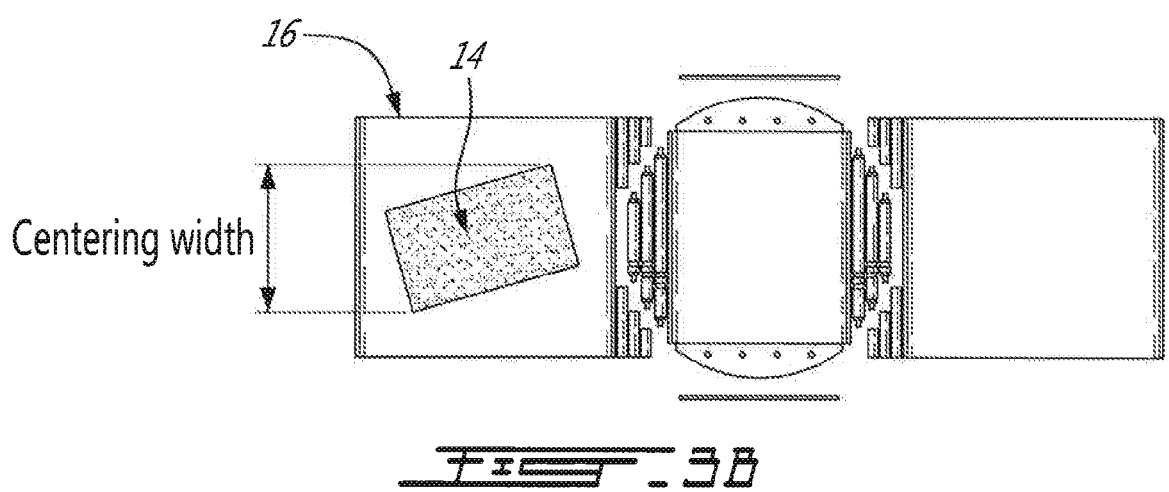

According to a more specific aspect of the present invention, the vision system 12 also measures product dimensions (width, length, height) and centering dimensions, i.e. its centering length and centering width. These two dimensions are illustrated in FIGS. 3A and 3B respectively. Reasons for determining these dimensions will be described hereinbelow.

According to another embodiment, the vision system 12 is configured to determine additional dimensions and/or characteristics of a product 14 on the conveyor 16, including without limitation, its texture, its color, writings thereon, etc. Such other characteristics may be used for example to better identify the product for processing by a further station (not shown) or for quality control purposes.

The turner conveyor 18 is in the form of a mattop conveyor that is mounted on a rotation axis (not shown) that is generally perpendicular to the conveying surface 36 defined by the conveyor 18 so as to allow the rotation of the conveying surface 36 thereabout. According to another embodiment, the conveying system of the turner conveyor is another type of conveyor than a mattop.

The conveyor 18 includes belts of diminishing lengths from center to each lateral side thereof so as to yield a conveying surface 36 having a generally rounded shape. This allows the rotation of the turner conveyor 18 while preserving the close proximity of the conveyors 16 and 22.

The vertical rotation axis of the conveyor 18 is motorized and driven by a servomotor (not shown) that allows the controlled rotation of the conveyor 18 within a 180 degrees range, and more precisely from −90 degrees to +90 degrees. According to another embodiment (not shown), another type of actuator is used in place of the servomotor, such as without limitations a step motor and a pneumatic actuator.

The servomotor receives a signal indicative of the initial orientation of the product 14 as determined by the vision system 12. Such signal is either directly sent from the vision system 12 or created and sent by the image processing unit 28 in response thereof.

As an input, the turner conveyor 18 receives a product 14 that arrives individually on the input conveyor 24 with no predetermined orientation and position. The conveyor 18 is rotated a number of degrees required to orient the product 14 in a rectified orientation.

The product-immobilizing device 20 includes parallel compressor plates 40 that are located on both lateral sides of the conveyor 18. These plates 40 are adapted to locate the product 14 in the center of the turner conveyor 18 and maintain its position in the rectified orientation while the turner conveyor 18 rotates back to its original position, i.e. aligned with the conveying direction 38.

According to the illustrated embodiment, the rectified orientation corresponds to the two shorter sides or the two longer sides of the rectangular object 14 to being parallel to the conveying direction 38. The rectified orientation may however be different in another application and/or as required by another processing station or equipment (not shown) located downstream from the output conveyor 22.

The plates 40 are movable between a retracted configuration relative to the product 14 on the conveyor 18 and a holding configuration wherein the product 14 is maintained in position and orientation while the turner conveyor 18 is moved from the rectifying orientation to the conveying orientation.

According to the illustrated embodiment, the plates 40 are slidably mounted on tracks (not shown) and are made movable thereon by the used of one or more conventional servo driven actuator. According to other embodiments (not shown), pneumatic cylinders, hydraulic cylinders, and/or electric actuators, etc, are used for moving the plates 40.

The plates 40 are so mounted to the tracks and made movable thereon as to yield a spring effect that biases the plates 40 towards each other, resulting in the product-immobilizing device 20 adjusting to products 40 real dimensions, often slightly different that their nominal dimensions.

In operation of the product immobilizing-device 20, the plates 40 are moved towards each other until they contact the product 14 on lateral side thereof. Knowing at least approximately the weight of the product 14, a pressure is applied by the plates 40 on both side of the product 14 that is sufficient to prevent the rotation thereof in unison with the conveyor 18 when the later is rotated.

The flat contact surfaces 39 of the plates 40 allow maximizing friction with the generally flat side of the products 14. This allows the product-immobilizing devices 20 to better maintaining the product 14 during rotation of the conveyor 18 thereunder.

The output of the conveyor 18 is the product 14 oriented at 0 or 90 degrees and laterally aligned on the conveyor 18 for the output conveyor 22, singulated and without back pressure.

As mentioned hereinabove, the rectified orientation of the product 14 is not limited to the one described herein and shown in the Figures. It is believed to be within the reach of a person skilled in the art to modify one or both of the conveyor 18 and device 20 and/or the operation thereof to orient and position the product 14 of another configuration or in accordance to the pattern required for example by an external equipment (not shown).

The output conveyor 22 receives the product 14 after they have been located and oriented on the turner conveyor 18 and moves it to an external equipment (not shown) for further processing or for transport. The output conveyor 22 is in the form of a mattop or a roller conveyor or else.

The conveyors 16, 18 and 22 are shown only schematically and will not be described herein in more detail for concision purposes and since they are believed to be well-known in the art. Of course, they include other components such as motors, gears, etc. that are not shown in the Figures.

The operation of the product orientor 10 will now be described in more detail with reference to FIGS. 2A to 2G.

As an input to the product orientor 10, a product 14 arrives on the vision system conveyor 16 from the input conveyor 24 or directly thereon (see FIG. 2A). The product 14 is then in any orientation and position. The vision system 12 then measures the dimensions and the initial orientation of the product 14 and its position is determined. It is to be noted that this measurement step takes a fraction of a second, i.e. typically less than 100 milliseconds.

The conveyors 16 and 18 are then energized so as to move the product 14 onto the turner conveyor 18 (see arrow 38 on FIG. 2B). The centering lengths (see FIGS. 3A-3B) measured by the vision system 12 are used in combination with signals from other sensors (not shown), such as without limitations one or more laser-based sensors, one or more photoelectric sensors, etc. to stop the forwarding movement of the turner conveyor 18 when the product 14 is centered near the rotation axis of the turner conveyor 18, that is at the center of the conveyor 18.

Based on the information provided by the vision system 12, the turner conveyor 18 rotates the product 14 to the desired orientation, with short (0 degrees) or long (90 degrees) side of the product leading (see arrow 42 on FIG. 2C).

Figure 2D:
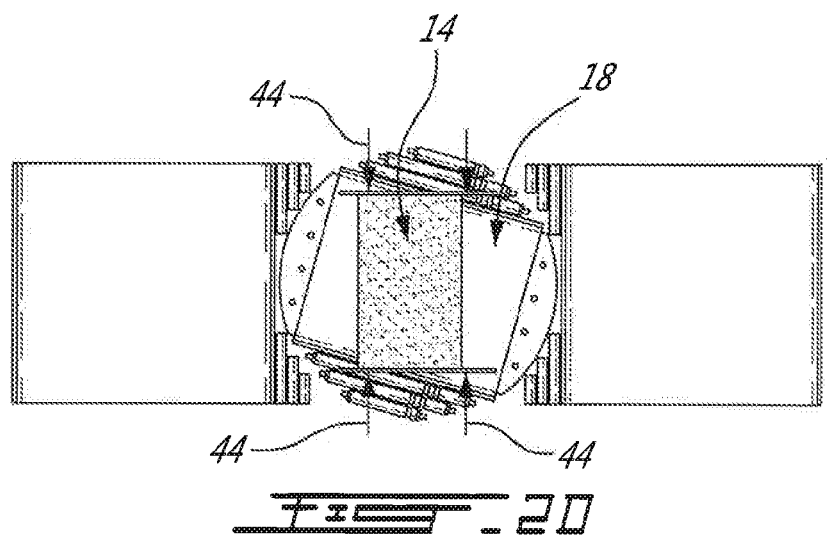

The product 14 is then laterally aligned (centered or justified) on the turner conveyor 18 using the lateral compression plates 40 (see arrow 44 on FIG. 2D).

Figure 2E:
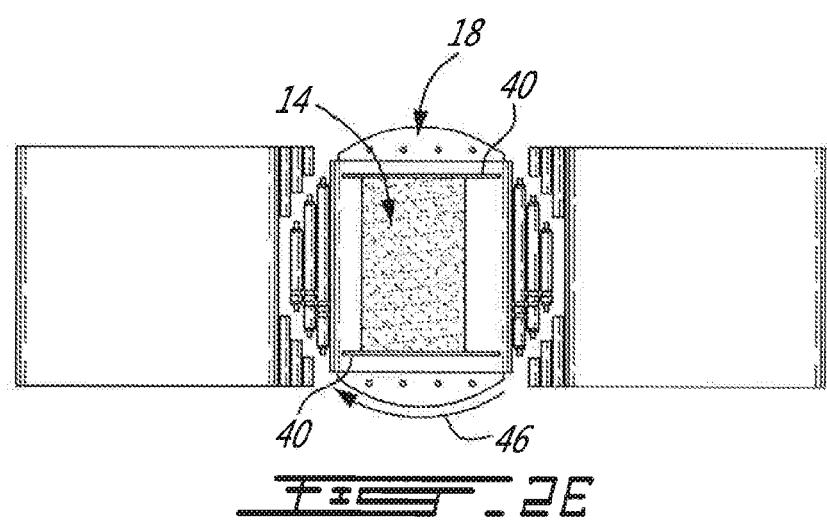

Turning now to FIG. 2E, the turner conveyor 18 rotates back to its original orientation (see arrow 46), where it is aligned with the product flow, while the product 14 remains clamped between the lateral compression plates 40. During this rotation, the product 14 slips on the conveyor surface 36.

Figure 2F:
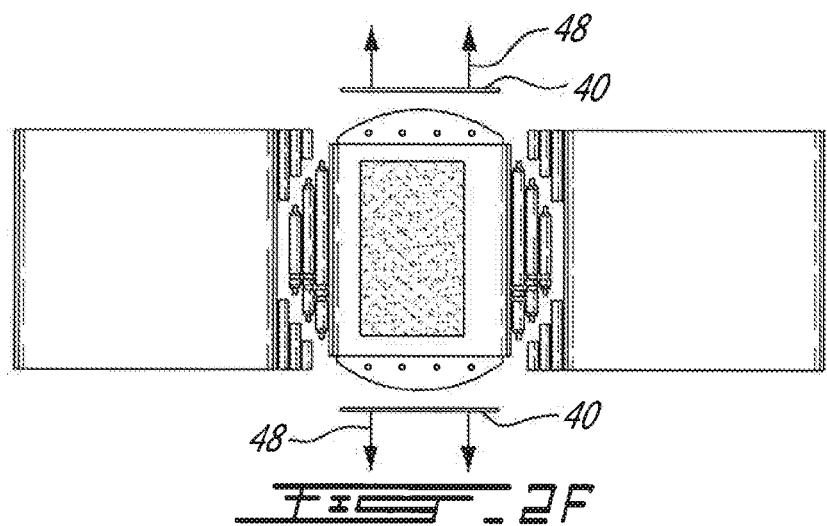

Then, both lateral compression plates 40 retract to release the product 14 (see arrows 48 on FIG. 2F).

Figure 2G:
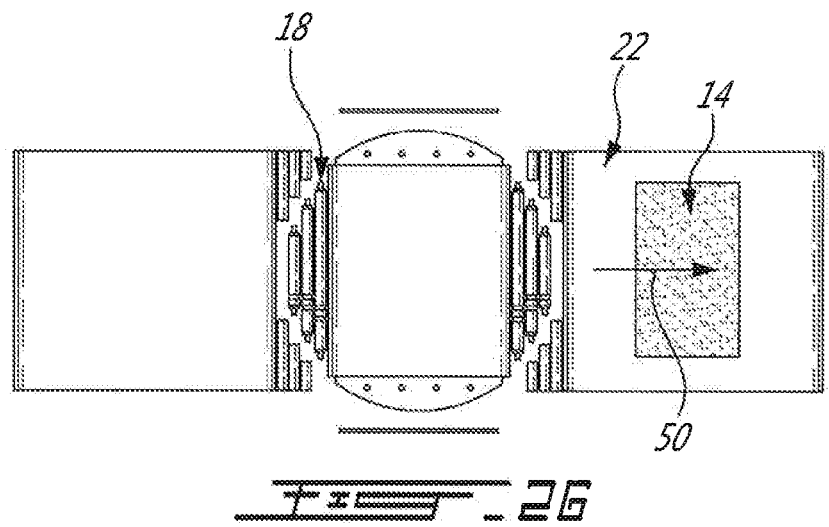

Finally, both conveyors 18 and 22 are energized so that the product 14 is transferred to the output conveyor 22 (see arrow 50) as can be seen in FIG. 2G.

It is to be noted that the orientor 10 is capable of processing more than one product at a time. For example, the product feeding speed may be such that there is a product 14 simultaneously on each of the conveyors 16, 18 and 22.

Figure 4A:
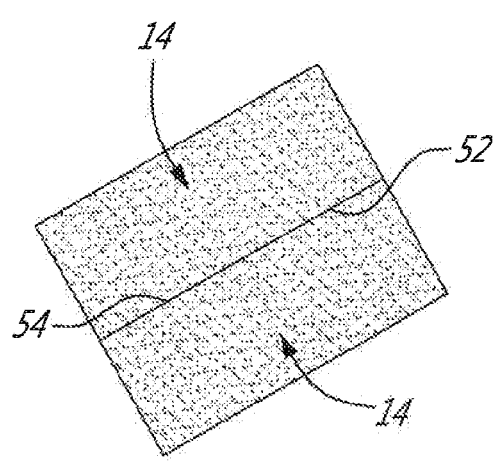
FIGS. 4A-4D are top plan schematic views showing examples of configurations of a pair of products that can be orient using the orientor from FIG. 1.
Figure 4B:
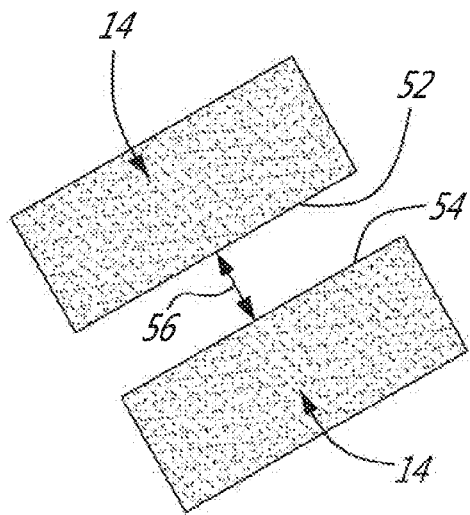
Figure 4C:
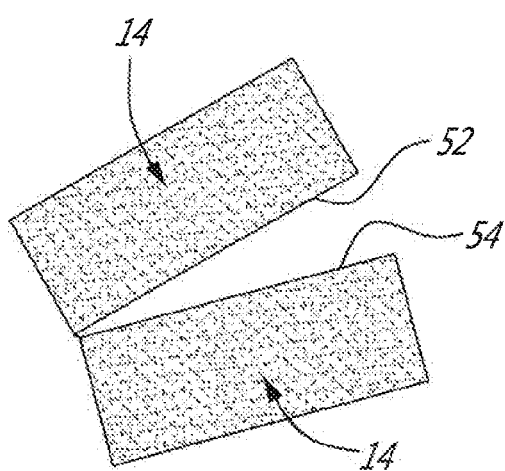
Figure 4D:
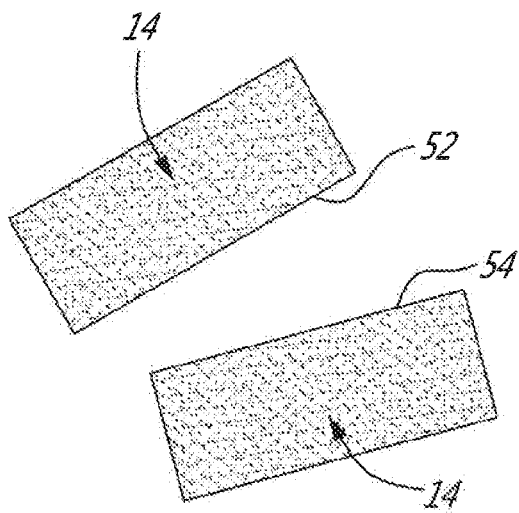

FIGS. 4A-4D show different configurations of a pair of products 14 that can be re-oriented by the product orientor 10. Indeed, according to the same embodiment, the product orientor 10 can receive two products 14 that arrive simultaneously on the input conveyor 24 in any orientation and position, including without limitations:

side by side, i.e. one edge 52 of one product 14 is completely touching a similar opposite edge 54 of the other product 14 as illustrated in FIG. 4A;

parallel offset, i.e. there is a constant gap 56 between one edge 52 of one product 14 and the similar opposite edge 54 of the other product 14 as illustrated in FIG. 4B;

angled, i.e. the gap between one edge 52 of one product 14 and the similar opposite edge 54 of the other product 14 is not constant, while the products 14 can have a point of contact or not, as illustrated in FIG. 4C; and angled offset, i.e. the leading edge 52 of one product 14 is not in line with the leading opposite edge 54 of the other product, and both products 14 can either be side by side, parallel without touching each other or angled, as illustrated in FIG. 4D.

In addition to the above-mentioned measurements, the vision system 12 then further measures the gap, the angle and the offset between the two products 14 when two products 14 are supplied as input.

If required, the lateral compression plates 40 are activated, prior to holding the two products 14 to better align the products 14 before being released.

It is believed to be within the reach of a person skilled in the art to adapt the orientor 10 as described herein to process products of other shape and dimensions that those described and shown herein.

It is to be noted that many modifications could be made to the orientor 10 described hereinabove and illustrated in the appended drawings. For example:

while the vision system 16 and turner conveyors 18 have been shown and described herein as being adjacent, they are not limited to such a configuration and one or more additional conveyors (not shown) may be used therebetween. Such additional conveyors are configured to maintain the orientation of the product 14 traveled thereon;

a pre-centering conveyor can be provided upstream from the vision system conveyor 18 to roughly or precisely center the product 14 before it enters the orientor 10. A device including skewed rollers or a centering mechanism could then be used;

a typical configuration for the sensor(s) 26 of the vision system 12 uses a single sensor positioned vertically above the conveyor 16 as described hereinabove. Additional sensors may be placed at an angle to provide a different perspective. The total number of sensors depends for example on the final configuration of the product orientor 10;

product dimensions measured by the vision system 12 can further be used to identify products that are different from their theoretical/expected dimensions. Considering that those measurements would vary depending on product type, a quality factor of the measurements would also be determined by the vision system 12 to allow tolerances to be adjusted;

the orientor 10 laterally aligns the products 14 on the conveyor 18. Depending on the requirements of the external equipment downstream from the orientor 10, the products 14 can be either centered or justified on one side of the turner conveyor 18.

It is to be understood that embodiments of the product orientor are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

The invention claimed is:

1. A product orientor comprising:
   a turner conveyor that defines a conveying plan and that is rotatable about a rotation axis that is perpendicular to the conveying plan; the conveyor being rotatable about the rotation axis between a conveying orientation, wherein a product received thereon is in an initial orientation relative to the conveying orientation, and a rectifying orientation, wherein the product is in a predetermined orientation relative to the conveying orientation; and
   an immobilizing device that is movable between a retracted configuration relative to the product and a holding configuration, wherein the product is maintained in the predetermined orientation while the turner conveyor is moved from the rectifying orientation to the initial conveying orientation.

2. The product orientor as recited in claim 1, further comprising a vision system for determining the initial orientation of the product.

3. The product orientor as recited in claim 2, wherein the vision system comprises a vision system conveyor adjacent the turner conveyor upstream therefrom and at least one sensor having a view on the vision system conveyor.

4. The product orientor as recited in claim 3, wherein the product is transported on the vision sensor conveyor from an input conveyor positioned adjacent and upstream therefrom.

5. The product orientor as recited in claim 3, wherein at least one of the vision system conveyor and the turner conveyor is a mattop-type conveyor.

6. The product orientor as recited in claim 3, wherein the at least one sensor includes a plurality of sensors positioned at different angles relative to the turner conveyor.

7. The product orientor as recited in claim 2, wherein the vision system comprises an image processing unit.

8. The product orientor as recited in claim 2, wherein the vision system being further for determining a position of the product relative to the turner conveyor prior to the product being transported onto the turner conveyor; wherein the immobilizing device using the position of the product prior to being transported onto the turner conveyor to adjust a position of the product on the turner conveyor.

9. The product orientor as recited in claim 1, wherein the immobilizing device includes two lateral plates; while in the holding configuration the two lateral plates are pressed onto the product from two opposite sides thereof.

10. The product orientor as recited in claim 9, wherein the two opposite sides correspond to two lateral sides of the turner conveyor that are generally parallel to the conveying orientation.

11. The product orientor as recited in claim wherein the turner conveyor is rounded.

12. The product orientor as recited in claim 1, wherein the product is transported on the product orientor from an input conveyor that is positioned adjacent the product orientor upstream therefrom.

13. The product orientor as recited in claim 1, wherein the product is transported on an output conveyor when the product is in the rectified orientation.

14. The product orientor as recited in claim 1, wherein the turner conveyor further comprising a servomotor for said rotating the conveyor about the rotation axis.

15. A product orientor comprising:
   a vision system including i) a vision system conveyor ia) for receiving a product thereon and ib) defining a conveying direction, and ii) at least one sensor having a view on the vision system conveyor for determining an initial orientation of the product relative to the conveying direction;
   a turner conveyor adjacent the vision sensor conveyor, downstream thereof, that defines a conveying plan and that is rotatable about a rotation axis that is perpendicular to the conveying plan; the conveyor rotating about the rotation axis between a conveying orientation, wherein the product received thereon from the vision system conveyor is in the initial orientation relative, and a rectifying orientation, wherein the product is in a predetermined orientation relative to the conveying orientation; and
   an immobilizing device including two lateral plates movable between a retracted configuration relative to the product and a holding configuration wherein the product is maintained in the predetermined orientation while the turner conveyor is moved from the rectifying orientation to the initial conveying orientation.

16. A method for orienting a product comprising:
   receiving a least one product on a conveying surface that defines a conveying direction; the at least one product having an initial orientation relative to the conveying direction;
   rotating in unison the conveying surface and the at least one product thereon from the initial orientation of the product to a predetermined rectified orientation relative to the conveying direction; and
   immobilizing the at least one product in the rectified orientation while the conveying surface is rotating back the conveying direction.

17. The method as recited in claim 16, wherein the at least one product is selected from a list consisting of carton, totes open top carton, tray, bag and pouch.

18. The method as recited in claim 16, further comprising creating a visual representation of the at least one product prior to rotating in unison the conveying surface and the at least one product thereon and using the visual representation to determine the initial orientation of the product at least one product.

19. The method as recited in claim 18, further comprising analyzing the visual representation of the at least one product to determine at least one additional characteristic thereof.

20. The method as recited in claim 16, wherein the at least one product includes two products; the method further comprising aligning the two products before the rotating step.

* * * * *